(12) United States Patent
Inada

(10) Patent No.: US 8,345,922 B2
(45) Date of Patent: Jan. 1, 2013

(54) APPARATUS FOR DETECTING A PUPIL, PROGRAM FOR THE SAME, AND METHOD FOR DETECTING A PUPIL

(75) Inventor: Junya Inada, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 601 days.

(21) Appl. No.: 12/585,053

(22) Filed: Sep. 1, 2009

(65) Prior Publication Data

US 2010/0054548 A1   Mar. 4, 2010

(30) Foreign Application Priority Data

Sep. 3, 2008 (JP) ................................ 2008-226406
Sep. 3, 2008 (JP) ................................ 2008-226407

(51) Int. Cl.
*G06K 9/00* (2006.01)

(52) U.S. Cl. ........ 382/103; 382/107; 382/115; 382/118; 382/167

(58) Field of Classification Search .................. 382/103, 382/107, 115, 118, 128, 167; 351/204, 205, 351/206, 211

See application file for complete search history.

(56) References Cited

U.S. PATENT DOCUMENTS

| | | | |
|---|---|---|---|
| 4,973,149 A * | 11/1990 | Hutchinson | 351/210 |
| 5,543,887 A | 8/1996 | Akashi | |
| 6,633,655 B1 * | 10/2003 | Hong et al. | 382/118 |
| 7,742,623 B1 * | 6/2010 | Moon et al. | 382/103 |
| 7,784,943 B2 * | 8/2010 | Adachi et al. | 351/206 |
| 7,916,904 B2 * | 3/2011 | Suzuki et al. | 382/118 |
| 7,972,266 B2 * | 7/2011 | Gobeyn et al. | 600/301 |
| 8,023,699 B2 * | 9/2011 | Namgoong | 382/115 |
| 2005/0031173 A1 * | 2/2005 | Hwang | 382/118 |
| 2006/0098867 A1 * | 5/2006 | Gallagher | 382/167 |
| 2006/0204041 A1 * | 9/2006 | Hammoud et al. | 382/107 |
| 2007/0201724 A1 * | 8/2007 | Steinberg et al. | 382/103 |
| 2008/0151186 A1 | 6/2008 | Adachi et al. | |

FOREIGN PATENT DOCUMENTS

JP        A-2002-282210        10/2002

OTHER PUBLICATIONS

Office Action dated Jun. 22, 2010 from Japanese Patent Office in corresponding JP Patent Application No. 2008-226407 (and English Translation).

* cited by examiner

*Primary Examiner* — Alex Liew
*Assistant Examiner* — Aklilu Woldemariam
(74) *Attorney, Agent, or Firm* — Posz Law Group, PLC

(57) ABSTRACT

A pupil detecting apparatus detects an edge of a pupil in an image of a face. An outline of an upper eyelid is also detected. The apparatus selects an effective edge extending along the pupil by removing a part of edge extending along the upper eyelid from the edges detected. Then, the apparatus applies the circle Hough transformation to the effective edge in order to obtain a center of the pupil and a radius of the pupil. Thereby, it is possible to detect the pupil accurately even if a part of the pupil is covered.

12 Claims, 7 Drawing Sheets

APPARATUS FOR DETECTING A PUPIL, PROGRAM FOR THE SAME, AND METHOD FOR DETECTING A PUPIL

CROSS REFERENCE TO RELATED APPLICATION

This application is based on Japanese Patent Applications No. 2008-226406 filed on Sep. 3, 2008, and No. 2008-226407 filed on Sep. 3, 2008, the contents of which are incorporated herein by reference in its entirety.

FIELD OF THE INVENTION

The present invention relates to a pupil detection, and may be applied as a form of an apparatus, a program and a method.

BACKGROUND OF THE INVENTION

Conventionally, a technology that calculates a sight direction by detecting a region of an eye and/or a location of a center of a pupil from a face image captured by a camera is known. For example, in an invention in the patent document 1 listed below, a center of a pupil is detected by using the following process. First, a region of an eye on an image is detected by a template matching method. An edge or edges are detected within the region of the eye detected. Then, the circle Hough transformation is applied to the detected edge(s) in order to obtain a circle equation and to detect a center of the pupil. Then, the apparatus calculates a sight direction based on a relative relationship between the region of the eye and the center of the pupil.

Patent document 1: JP-2002-282210-A

However, an outline of a pupil cannot be always detected in a perfect form. A part of a pupil may hide below an eyelid depending on direction of a face or direction of a sight direction. In addition, since an eye shape also has a personal difference. Therefore, in some cases, a part of a pupil may hide below an eyelid even in a condition where a person faces front side. For example, there may be a case where an edge is detected when an upper part of a pupil is hidden below an upper eyelid as shown in FIG. 17A. Here, a pupil is a black region located on a center of an iris. In the drawings the pupil is illustrated slightly large. As shown in FIG. 17B, an edge of the upper eyelid and an edge of the pupil are seemingly detected in a continuous form. If the circle Hough transformation is performed to such edge, a result is influenced by the edge of the eyelid as shown in FIG. 17C. For this reason, detecting process may detect a location of a pupil with error component.

SUMMARY OF THE INVENTION

It is therefore an object of the present invention to provide an apparatus for detecting a pupil, a method for detecting a pupil and a computer program for the apparatus capable of detecting a pupil with sufficient accuracy even if a part of the pupil is hidden.

The present invention may be appreciated as an apparatus for detecting a pupil, a method for detecting a pupil and a computer program. The computer program is stored in a computer readable medium and causes a computer to detect a pupil in a face image. One embodiment of the present invention is a pupil detecting apparatus including an acquisition means, an eye detection means, an edge detection means, and a pupil detection means. The acquisition means acquires an image of a human face which is provided by capturing a face. The eye detection means detects an eye from the image acquired by the acquisition means. The edge detection means detects edge in a region of the eye detected by the eye detection means. The pupil detection means detects a pupil from the edge detected by the edge detection means. Further, the present invention is provided with an eye shape detection means and a selection means. The eye shape detection means detects eye shape. The selection means selects only the effective edge extending along a pupil from the edge detected by the edge detection means based on the eye shape detected by the eye shape detection means. The pupil detection means detects a pupil from the effective edge selected by the selection means.

According to the embodiment, since a pupil can be detected only, from the edge extending along the pupil selected based on the eye shape, the influence by the eye shape can be eliminated and a pupil can be detected with sufficient accuracy.

The pupil detection means may be configured to compare a first pupil detection result that indicates the pupil detected based on all of the edge detected by the edge detection means and a second pupil detection result that indicates the pupil detected based on only the effective edge selected by the selection means, and to select one of the first pupil detection result and the second pupil detection result based on a predetermined criterion for selection.

According to the embodiment, even if a noise component is in data indicative of the edge, it is possible to detect a pupil with sufficient accuracy.

The pupil detection means may be configured to compare the first pupil detection result and the second pupil detection result in heights in the image, and to select one that is located higher. According to the embodiment, since one of the pupil detection results that is located higher than the other one is selected as a selected result, therefore, it is possible to detect the pupil accurately in many situations.

The pupil detection means may be configured to compare the first pupil detection result and the second pupil detection result in size in the image, and to select one that is larger. According to the embodiment, since one of the pupil detection results that shows larger pupil is selected as a selected result, therefore, it is possible to detect the pupil accurately in many situations.

The eye shape detection means may be configured to detect an outline of an eyelid as the eye shape. The selection means may be configured to select only the effective edge extending along a pupil by removing edge extending along the outline of the eyelid detected by the eye shape detection means. According to the embodiment, since only the edge extending along the pupil is selected by removing edge extending along the outline of the eyelid, it is possible to reduce the influence of the outline of the eyelid and to detect a pupil with sufficient accuracy.

The eye shape detection means may be configured to detect an outline of an upper eyelid as the outline of the eyelid. The selection means may be configured to select only the edge extending along a pupil by removing edge extending along the outline of the upper eyelid detected by the eye shape detection means. According to the embodiment, it is possible to detect a pupil accurately by removing edge extending along the upper eyelid that hides a pupil in many cases. In addition, it is possible to detect a pupil with less amount of process, since a removing region is restricted to an upper eyelid region.

The eye shape detection means may be configured to detect the eye shape based on a face shape model. According to the embodiment, the eye shape can be detected with sufficient accuracy. In addition, since the eye detection means may be configured to use the face shape model commonly, and to use similar process. It is possible to provide the apparatus with simple configuration and processing.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Hereinafter, embodiments of the present invention are described in detail by referring drawings.

First Embodiment

Figure 1:
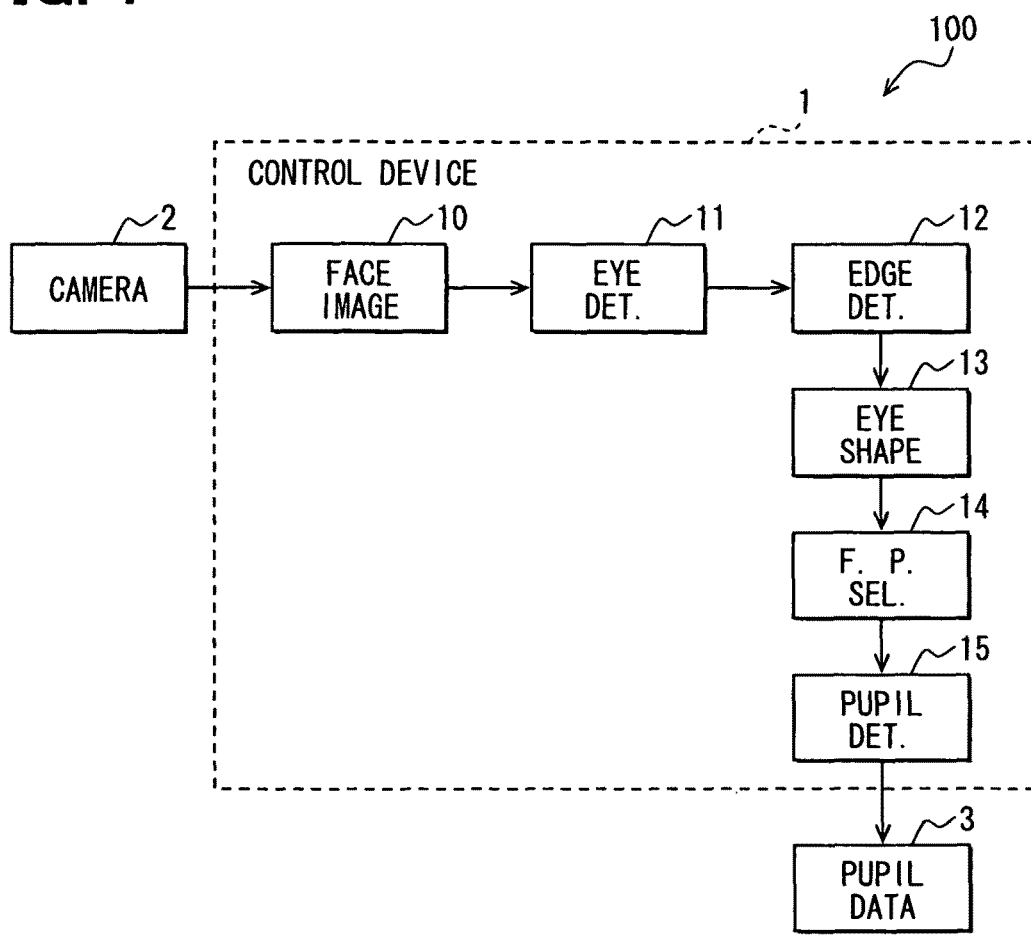
FIG. 1 is a block diagram showing a pupil detecting apparatus in a first embodiment of the present invention.

FIG. 1 is a block diagram showing a pupil detecting apparatus 100 in a first embodiment of the present invention.

The pupil detecting apparatus 100 is used by being mounted on a vehicle. The pupil detecting apparatus 100 is provided with a control device 1 mainly constructed with a computer, and the camera 2. The control device 1 includes a known computer readable storage medium in which a program for functioning the control device as the pupil detecting apparatus is stored. The pupil detecting apparatus 100 may be appreciated as a system including a pupil location using apparatus 3. As shown in FIG. 1, the control device 1 is provided with a face image acquisition section 10, an eye detection section 11, an edge detection section 12, an eye shape detection section 13, a feature amount selection section 14, and a pupil circle detection section 15. The camera 2 is a means for taking an image. The apparatus 3 receives data indicative of a location of a pupil in an eye. The apparatus 3 uses the data for controlling a device on a vehicle. The apparatus 3 may be appreciated as a pupil data using device.

The face image acquisition section 10 acquires an image data showing a face image from an image capturing board which captures the face image taken by the camera 2 and memorizes the data temporarily.

Here, the camera 2 is arranged in a location which can take an image of a face of a driver who sits down to a driver's seat in the vehicle from a front side of the driver. In detail, the camera 2 is installed in a meter board in an instrument panel, or its neighborhood. The camera 2 is equipped with an image sensor such as a CCD or CMOS type sensor and a lens having a focal distance which enables the camera to take a face image clearly.

Two lighting devices (not shown) which illuminates the face of the driver from both right and left sides with near infrared rays are installed in the meter board in the instrument panel near the camera 2. By illuminating an eye of the driver with near infrared rays, the pupil of the driver in the region of the eye can be clearly recognized on an image.

The eye detection section 11 detects a region of an eye from a region where a face is placed within the image. The image is obtained as a form of image data which is acquired by the face image acquisition section 10. In this embodiment, a face shape model is used as a method for detecting a region of an eye. For this purpose, the apparatus may use a technique described in "I. Matthews and S. Baker, "Active Appearance Models Revisited," International Journal of Computer Vision, Vol. 60, No. 2, November, 2004, pp. 135-164."

The edge detection section 12 detects one or a plurality of edges in the region of the eye detected by the eye detection section 11. In detail, first, the image is converted in a binary form by a predetermined threshold. Then, the well-known Sobel filtering process is applied to the data. As a result, a boundary or a plurality of boundaries of regions that are different in a luminance and/or a color tone are detected as the edge of the pupil.

The eye shape detection section 13 detects a shape of an upper eyelid of the eye from the region of the eye detected by the eye detection section 11. The shape of the upper eyelid may be referred to as an upper eyelid outline. The face shape model mentioned above also used in the above processing.

The feature amount selection section 14 selects only one or a plurality of effective edges or a part of edge which extend along a pupil by removing some edges or a part of edge which extend along the upper eyelid outline detected by the eye shape detection section 13 from the edges detected by the edge detection section 12.

The pupil circle detection section 15 outputs a pupil detection result. The pupil detection result is obtained by detecting a pupil based on only an effective edge which is selected by the feature amount selection section 14. In detail, a pupil is detected as a circle in the image. The effective edge is selected as an edge which is considered to show an outline of a pupil alone with comparatively high possibility. The pupil detection result includes a set of center coordinates and a radius of the circle which is obtained based on only the effective edge. In the above processing, the well-known circle Hough transformation is used.

Next, processing performed by the pupil detecting apparatus 100 is explained in detail.

Figure 2:
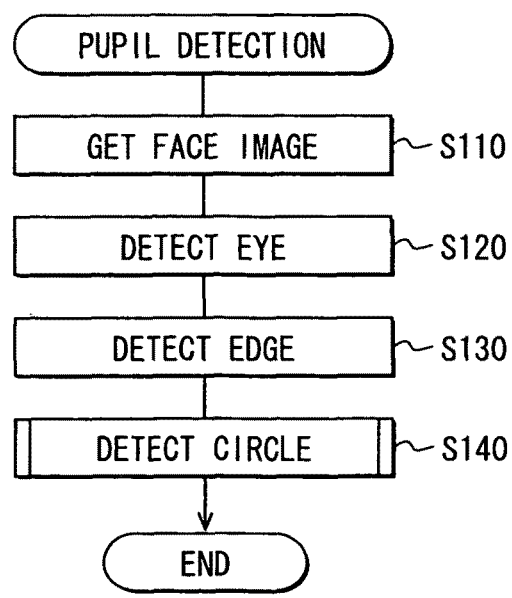
FIG. 2 is a flow chart of the pupil detecting apparatus in the first embodiment of the present invention.

FIG. 2 is a flow chart showing pupil detection processing which is performed by the pupil detecting apparatus 100. The pupil detection processing is started by turning on an ignition switch of the vehicles.

In S110, the apparatus gets and acquires an image data which shows a face image of the driver taken by the camera 2.

The processing in S110 corresponds to processing performed in the face image acquisition section 10.

In S120, a region of an eye is detected by performing fitting processing of the image data acquired in S110 using a face shape model. The processing in S120 corresponds to processing performed in the eye detection section 11.

Figures 3A, 3B, 3C, 3D:
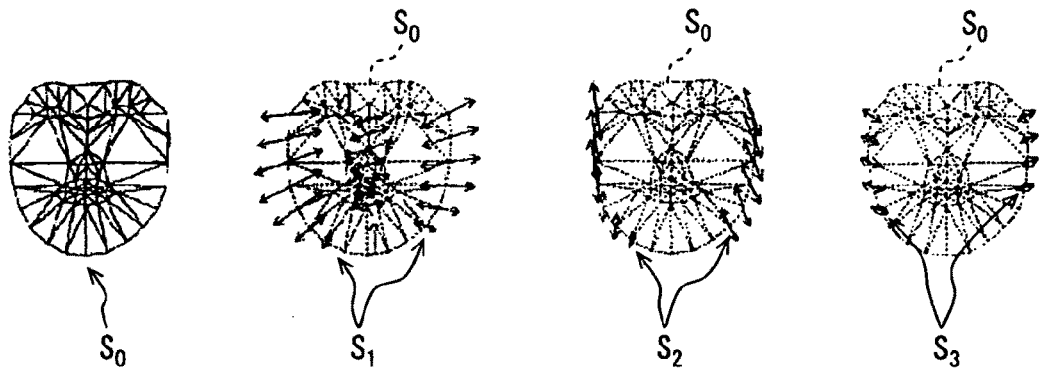
FIGS. 3A, 3B, 3C, and 3D are explanatory drawings for using a face shape model.

The face shape model is explained by referring to the drawings. FIG. 3A shows a base shape s0. FIG. 3B shows a shape vector s1. FIG. 3C shows a shape vector s2. FIG. 3D shows a shape vector s3. In FIGS. 3B, 3C, and 3D, the vectors s1, s2, and s3 are drawn on the base shape s0 in order to clarify the starting point of a vector.

In the face shape model, the base shape s0 is predetermined as shown in FIG. 3A. The base shape s0 is expressed by a plurality of triangular shaped meshes showing a front view of a face. The shape vectors are predetermined as shown in FIGS. 3B, 3C, and 3D. The shape vectors include n vectors si (i=1, 2, 3 ..., n). The number n is a natural number. The shape vectors si shows direction of the face from the base vector s0. The face shape model expresses a shape of a face by performing calculation shown in an expression (1) in which the base shape s0 and n shape vectors si are used.

$$s = s0 + \sum_{i=1}^{n} pisi \quad (1)$$

In the expression (1), pi (i=1, 2, 3 ... ) represents superposition coefficients. The shape vectors si (i=1, 2, 3 ... ) are vectors that have starting points on the apexes of the meshes forming the base shape s0. The apex of the mesh may be called as a mesh apex. The shape vectors si are defined for all the apexes on the base shape s0. In FIGS. 3B, 3C, and 3D, the shape vectors s1, s2, and s3 are illustrated for only a part of the mesh apexes in order to simplify the drawings.

In the face shape model, the base appearance image A0(x) is predetermined. The base appearance image A0(x) is an image showing an appearance considered as a basic appearance for a front view of a face. The appearance images Ai(x) are predetermined. The appearance images Ai(x) include m images Ai(x) (i=1, 2, 3 ..., m). The number m is a natural number. The appearance images Ai(x) show appearance variations of face from the base appearance image A0(x). The face shape model expresses an appearance of a face by performing calculation shown in an expression (2) in which the base appearance image A0(x) and m appearance images Ai(x) are used.

$$A(x) = A0(x) + \sum_{i=1}^{m} \lambda i A i(x) \quad (2)$$

In the expression (2), x shows the two-dimensional coordinates on the base shape s0. The λi (Lambda-i) (i=1, 2, 3 ... ) represents superposition coefficients.

Figure 4:
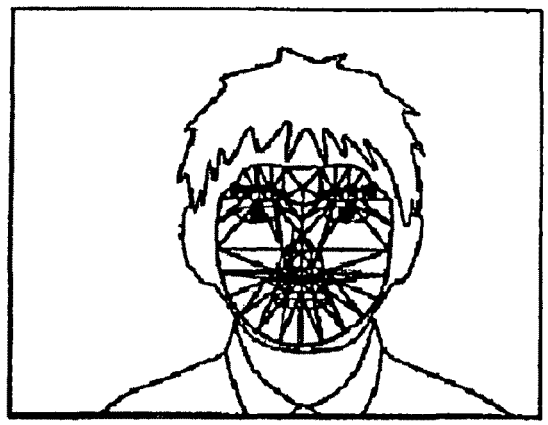
FIG. 4 is an explanatory drawing for performing a fitting by a face shape model.

That is, in S120, the apparatus performs fitting processing which varies the superposition coefficients pi and the superposition coefficients λi (Lambda-i) so that the image obtained by the expressions (1) and (2) fits to and matched with the face image acquired in S110 as shown in FIG. 4.

In addition, the pupil detecting apparatus 100 stores a plurality of different sets of base shapes s0, n shape vectors si, basic appearance images A0(x), and m appearance images Ai(x) depending on sex, age, and ethnic groups. The pupil detecting apparatus 100 is configured to enable a user, e.g., a driver, to select one specific set from the plurality of sets of s0, si, A0(x), and Ai(x) based on the own sex, age, and ethnic group.

Then, in S130, after performing binarization processing within the region of the eye detected in S120 by using a predetermined threshold value, one or a plurality of edges on the image is detected by using the Sobel filtering. The processing in S130 corresponds to processing performed in the edge detection section 12.

Then, in S140, pupil circle detection processing is performed. In the processing, a pupil is detected as a circle based the edge detected in S130, and a result of the detection is outputted as a pupil data to the device 3. The pupil data includes the center coordinates and the radius of the circle showing the pupil. Then, the apparatus completes the pupil detection processing.

Figure 5:
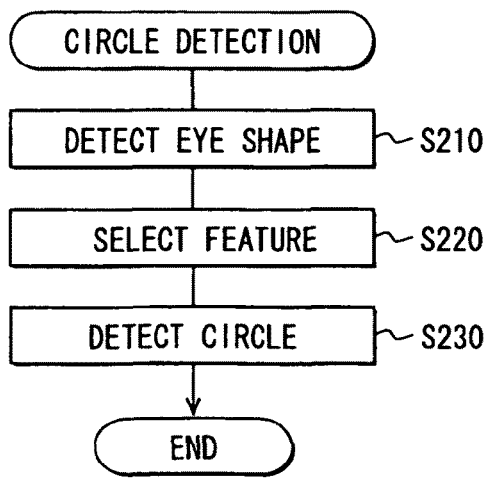
FIG. 5 is a flow chart for detecting a pupil circle.

Next, the pupil circle detection processing performed in S140 is explained in more detail. FIG. 5 is a flow chart for detecting a pupil circle.

In S210, an upper eyelid outline is detected as an eye shape using the face shape model. The upper eyelid outline can be detected based on a plurality of coordinates of the mesh apexes which is related to the eye on the face shape model. Those apexes are simultaneously located when the region of the eye is detected by the face shape model in S120. Those apexes may be called as feature points FP of a face.

Figure 6:
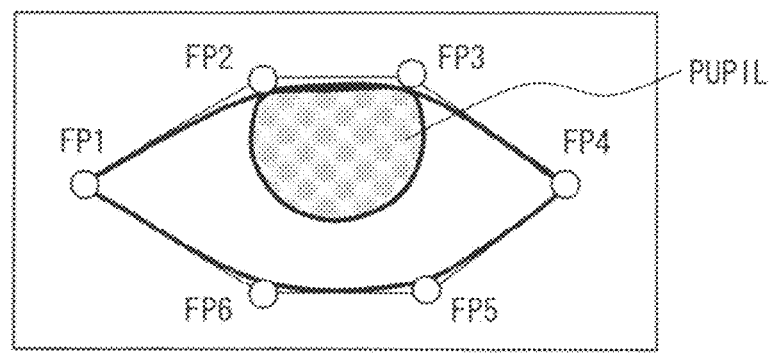
FIG. 6 is an explanatory drawing for showing feature points on an eye.

In detail, as shown in FIG. 6, the upper eyelid outline is detectable based on the feature points FP1, FP2, FP3, and FP4 which are detected when detecting the region of the eye by the face shape model. The processing in S210 corresponds to processing performed in the eye shape detection section 13.

Figure 7A:
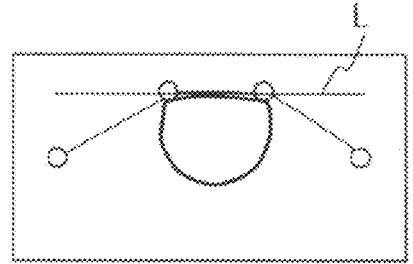
FIGS. 7A and 7B are explanatory drawings showing feature selection process.

Then, in S220, feature amount selection process for selecting only effective edge(s) is performed. The effective edge is considered to extend along a pupil alone. Here, the feature amount selection is performed by using the feature points FP2 and FP3 indicative of a location of the upper eyelid acquired in S210. In detail, a straight line L which passes both the feature points FP2 and FP3 is computed. Then, the apparatus defines a straight vertical line which passes the feature point FP1 corresponding to the location of the outside eye corner and is vertical to the straight line L. The apparatus locates a crossing point between the straight line L and the vertical line as a first crossing point. The apparatus defines a straight vertical line which passes the feature point FP4 corresponding to the location of the inside eye corner and is vertical to the straight line L. The apparatus locates a crossing point between the straight line L and the vertical line as a second crossing point. Then, a line segment which has the first and second crossing points as both ends is created from the straight line L. The line segment is shown in FIG. 7A. In FIG. 7A, the edges detected, the feature points FP1, FP2, FP3, and FP4, and a part of the straight line L are illustrated. The straight line L in FIG. 7A corresponds to the line segment.

Figure 7B:
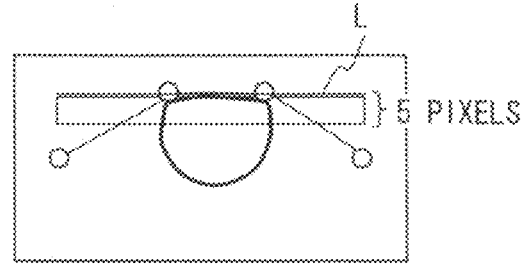

Next, a region between the line segment and a line located below from the line segment by a predetermined amount is defined. The region is also called an edge removal region. It is possible to assume that the edge(s) which exists in this edge removal region is the upper eyelid edge extending along the upper eyelid with high probability. Then, the upper eyelid edge is removed from all the detected edge(s) in the edge removal region. In this embodiment, the predetermined amount for determining the edge removal region is 5 pixels. As a result, the remaining edge(s) are selected as the effective edge(s). In FIG. 7B, the edge removal region is illustrated as a square box. Thus, the reason for restricting within the region which is set by the predetermined pixels is for removing certainly the edge or a part of edge extending along the upper eyelid. The processing in S220 corresponds to processing performed in the feature amount selection section 14.

Figure 8A:
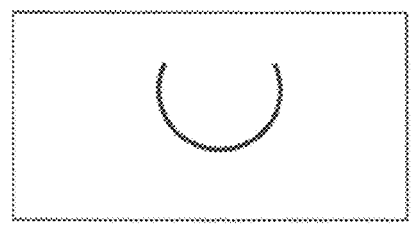
FIGS. 8A and 8B are explanatory drawings showing pupil circle detection process.
Figure 8B:
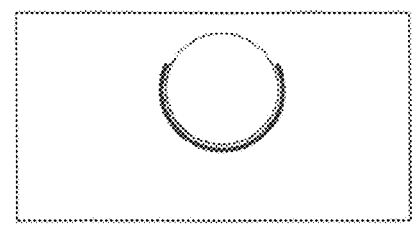

Then, in S230, the well-known circle Hough transformation is applied to the effective edge selected in S220. The transformation determines a circle equation based on the effective edge. In other word, the transformation detects a pupil as a circle that is estimated based on the effective edge. The apparatus outputs the center coordinates and the radius of the circle as data indicative of the pupil. FIG. 8A shows the effective edge selected by removing edge extending along the upper eyelid from the edges in S220. FIG. 8B shows a circle obtained by applying the circle Hough transformation on the effective edge in S230. The processing in S230 corresponds to processing performed in the pupil circle detection section 15. Then, the apparatus completes the pupil circle detection processing.

As mentioned above, according to the pupil detecting apparatus 100 of this embodiment, since a pupil is detected by using only the effective edge extending along the pupil selected by removing at least a part of edge extending along the upper eyelid outline, it is possible to eliminate an influence of the upper eyelid outline, and to detect the pupil with sufficient accuracy.

There is almost no possibility that a pupil is covered with things other than an upper eyelid. Therefore, the pupil detecting apparatus 100 of this embodiment is configured to removes only an edge extending along an outline of an upper eyelid. For this reason, the accuracy of pupil detection can be efficiently improved with a small processing load.

Since the eye shape detection section 13 detects an eye shape by using the face shape model in S210, it is possible to detect the eye shape with sufficient accuracy. Since the eye detection section 11 also detects an eye by using the face shape model in S120, it is possible to use the same processing portions for both sections. It is possible to achieve the apparatus with simple processing.

In the first embodiment, the face image acquisition section 10 provides an acquisition means, the eye detection section 11 provides an eye detection means, the edge detection section 12 provides an edge detection means, the eye shape detection section 13 provides an eye shape detection means, and the feature amount selection section 14 provides a selection means. In addition, the pupil circle detection section 15 provides the pupil detection means.

Second Embodiment

Hereinafter, a second embodiment of the present invention is described in detail by referring drawings. In the second embodiment, the same reference numbers as in the first embodiment are used for denoting portions in the second embodiment that are the same as or equivalent to the portions described in the first embodiment. The preceding description may be referenced for the portions denoted by the same reference numbers. In the following description, differences from the first embodiment are mainly described.

Figure 9:
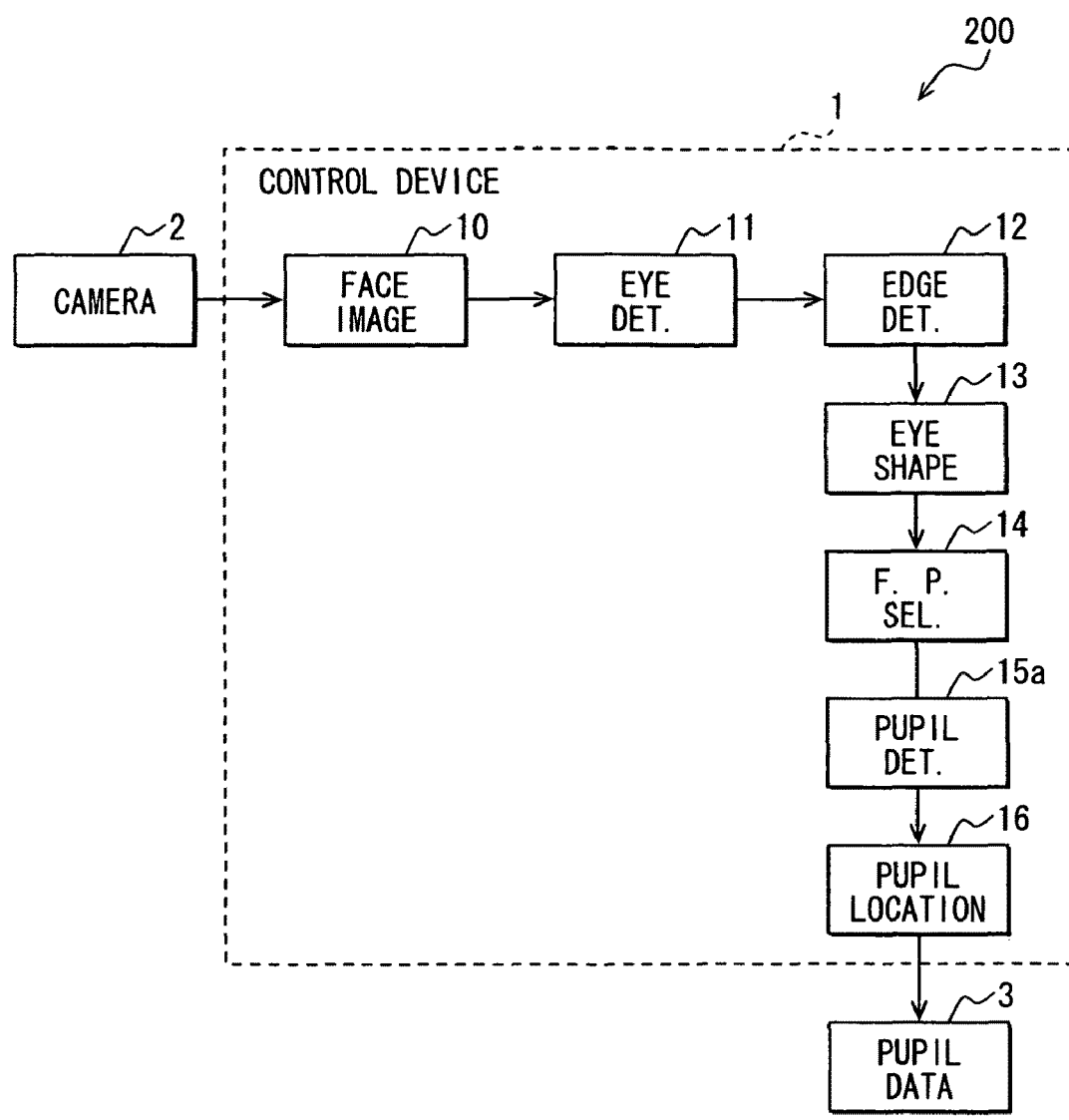
FIG. 9 is a block diagram showing a pupil detecting apparatus in a second embodiment of the present invention.

FIG. 9 is a block diagram showing a pupil detecting apparatus 200 in the second embodiment of the present invention.

This pupil detecting apparatus 200 has a pupil circle detection section 15a instead of the pupil circle detection section 15 in the first embodiment. In addition to the first embodiment, the pupil detecting apparatus 200 is provided with a pupil location determination section 16.

The pupil circle detection section 15a of the second embodiment outputs both a first pupil detection result and a second pupil detection result. The first pupil detection result is obtained by detecting a pupil based on all the edge detected by the edge detection section 12. In detail, the pupil is detected as a circle in the image. The circle may be referred to as a pupil circle. The first pupil detection result includes a set of center coordinates and a radius of the circle which is obtained based on all the edge. The second pupil detection result is obtained by detecting a pupil based on only an effective edge which is selected by the feature amount selection section 14. The effective edge is selected as an edge which is considered to show an outline of a pupil alone with comparatively high possibility. The second pupil detection result includes a set of center coordinates and a radius of the circle which is obtained based on only the effective edge. In the above processing, the well-known circle Hough transformation is used.

The pupil location determination section 16 compares the first pupil detection result and the second pupil detection result, and selects one pupil detection result from the first pupil detection result and the second pupil detection result both detected by the pupil circle detection section 15a. In the selection processing, a predetermined criterion is used. The criterion is determined to select most exact one among the pupil detection results. In this embodiment, the criterion is defined to select one pupil detection result that has a center of a circle located on a higher location in the image.

Next, processing performed by the pupil detecting apparatus 200 are explained in detail.

Figure 10:
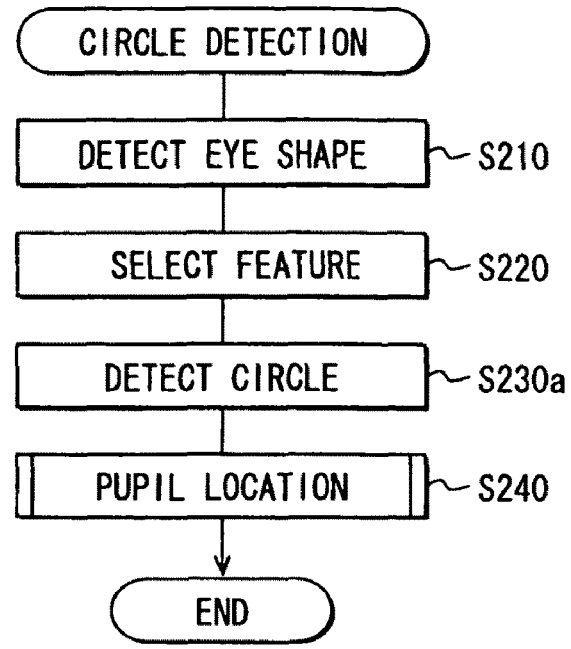
FIG. 10 is a flow chart for detecting a pupil circle.

FIG. 10 is a flow chart showing pupil detection processing which is performed by the pupil detecting apparatus 200. In the second embodiment, a step S230a is executed instead of the step S230 in the first embodiment. Further, a step S240 is executed in the second embodiment.

In S230a, the circle Hough transformation in applied to all the edge(s) detected in S130. As a result, a pupil is detected as a circle. The transformation obtains the center coordinates and the radius of the circle as the first pupil detection result. The circle Hough transformation is also applied to only the effective edge selected in S220. A pupil is detected as a circle. The transformation obtains the center coordinates and the radius of the circle as the second pupil detection result. The processing in S230a corresponds to processing performed in the pupil circle detection section 15a.

Then, in S240, pupil location determination processing is performed. In this processing, one pupil detection result is selected from the first and second pupil detection result by using the criterion. Again, the criterion is defined to select the one that has a center located higher. The selected pupil detection result is outputted as a pupil data to the device 3. The processing in S240 corresponds to processing performed in the pupil location determination section 16. Then, the apparatus completes the pupil circle detection processing.

Figure 11:
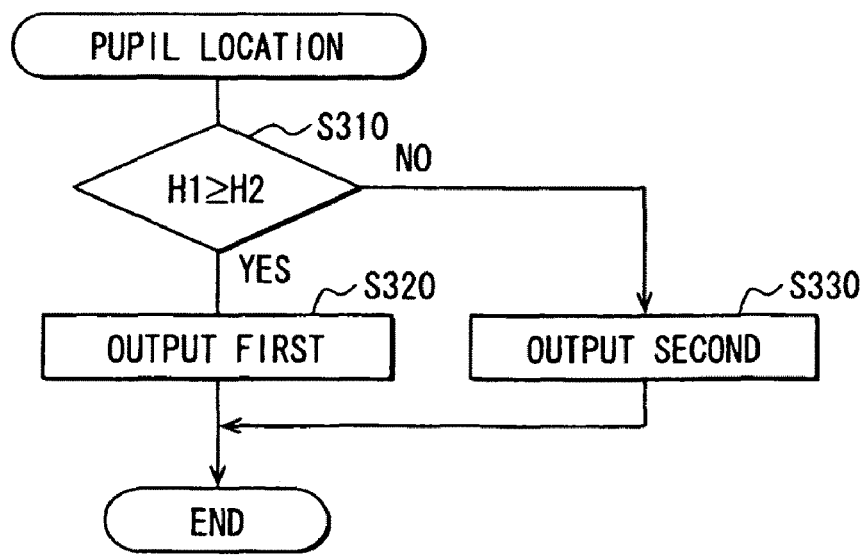
FIG. 11 is a flow chart for determining a location of a pupil.

Next, the pupil circle detection processing performed in S240 is explained in more detail. FIG. 11 is a flow chart for determining a location of a pupil.

In S310, it is determined that whether a height H1 of the center coordinates of the circle of the first pupil detection result is higher than a height H2 of the center coordinates of the circle of the second pupil detection result.

If the height H1 of the center coordinates of the circle of the first pupil detection result is higher than the height H2 of the center coordinates of the circle of the second pupil detection result, the routine branches to YES from S310 and proceeds to S320. If the determination in S310 is negative, the routine branches to NO from S310 and proceeds to S330.

In S320, since the first pupil detection result has a center that is higher or equal to the first pupil detection result is outputted as the pupil data to the device 3. Then, the apparatus completes the pupil location determination processing.

In S330, since it is a case that the second pupil detection result has a higher center, the second pupil detection result is outputted as the pupil data to the device 3. Then, the apparatus completes the pupil location determination processing.

The second pupil detection result shows a pupil detected only from the effective edge selected by referencing a detected data of the eye shape. For this reason, even if the upper part of the pupil is covered and hidden by the upper eyelid, the influence by the eye shape can be eliminated and the pupil can be detected with sufficient accuracy. That is, according to the second pupil detection result, the pupil can be detected with more accuracy in many cases than the first pupil detection result which is detected based on all the edge detected by the edge detection means.

However, if the image has a noise on a pupil, the second pupil detection result may not show a pupil with more accuracy than the first pupil detection result.

Figure 12A:
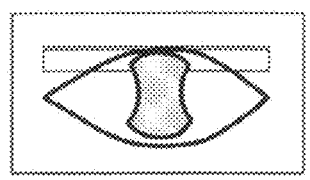
FIGS. 12A, 12B, and 12C are explanatory drawings for showing a second pupil detection result.
Figure 12B:
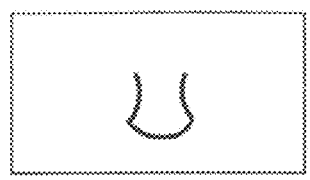
Figure 12C:
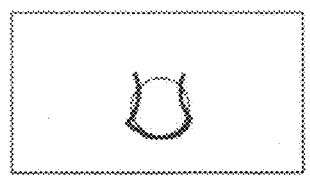

For example, as shown in FIG. 12A, if both sides of a pupil are hidden and missed by a noise, such as a reflection light, the edge extending along a pupil is detected in a depressed shape at both sides. In this case, the apparatus removes an upper part of the edge(s) as the edges extending along the eye shape as shown in FIG. 12B. Therefore, the succeeding processing is performed under influences of the depressed shape of the edges and a remaining lower part of the edges. As a result, apparatus detects a pupil as a circle that is located slightly lower and is smaller than the actual pupil as shown in FIG. 12C.

Figure 13A:
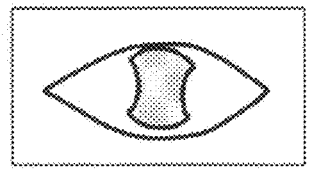
FIGS. 13A, 13B, and 13C are explanatory drawings for showing a first pupil detection result.
Figure 13B:
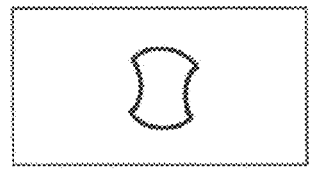
Figure 13C:
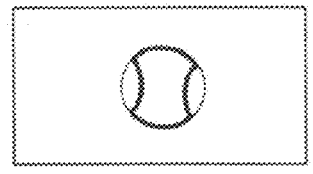

On the other hand, in a case that a pupil is detected based on all the edge(s) detected by the edge detection means, since the upper part of the edge(s) extending along a pupil is not removed as shown in FIG. 13B, it is possible to detect a circle that is close to the actual pupil as shown in FIG. 13C.

It is possible to detect a pupil with sufficient accuracy in many cases by comparing the second pupil detection result and the first pupil detection result, and selecting one as a final result based on a predetermined criterion that shows more exact one. For example, even if a noise component is in data indicative of the edge, it is possible to detect a pupil with sufficient accuracy.

The pupil detection means is configured to compare the first pupil detection result and the second pupil detection result in height in the image, and to select one that is located higher. Here, comparing the results in height means that the apparatus compares height locations of centers of pupil indicated by the first and second pupil detection results. For example, if both the first and second pupil detection results indicate circles in the image, the locations of the centers are compared with respect to the vertical height from the bottom of the image.

In the case illustrated in FIGS. 12A, 12B, and 12C, in the second pupil detection result, a pupil is detected as a circle that is slightly lower and smaller than the actual pupil, due to the influence of the lower part edge and the inwardly depressed edge. That is, in the processing for obtaining the second pupil detection result, some part of edge may be removed even if no part of a pupil is covered with things in order to suppress the influence of the eye shape. By using such processing, an upper part of edges are usually removed in many cases, since it is considered that a shape of a pupil is hardly influenced by things other than the upper eyelid. In addition to the above, if a noise is on a pupil, the edge becomes a shape inwardly depressed. Therefore, the second pupil detection result includes an error component since a pupil is detected as a circle slightly lower and smaller than the actual pupil. This processing is illustrated in FIGS. 12A, 12B, and 12C.

Figure 14:
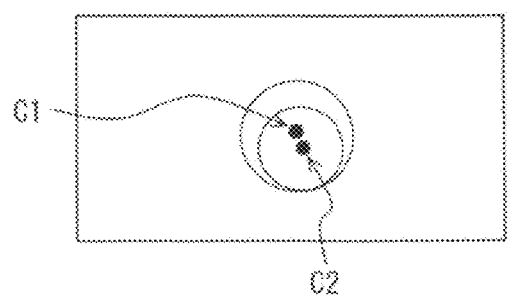
FIG. 14 is an explanatory drawing showing determined pupil locations.

On the other hand, since the first pupil detection result detects a pupil from all the edge(s) without removing the upper part, it is possible to detect a pupil as a circle close to the actual pupil. This processing is illustrated in FIGS. 13A, 13B, and 13C. That is, as shown in FIG. 14, the first pupil detection result has center coordinates of a circle in a higher location than the other. The first pupil detection result shows a circle that is closer to a circle of the actual pupil than the other. In FIG. 14, C1 shows center coordinates of a pupil shown by the first pupil detection result. C2 shows center coordinates of a pupil shown by the second pupil detection result.

Figure 15A:
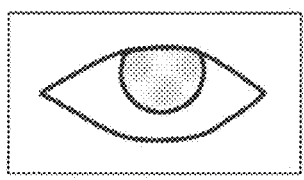
FIGS. 15A, 15B, and 15C are explanatory drawings for showing a first pupil detection result.
Figure 15B:
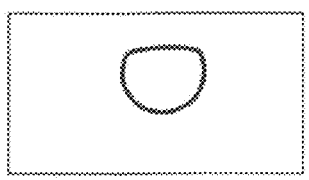
Figure 15C:
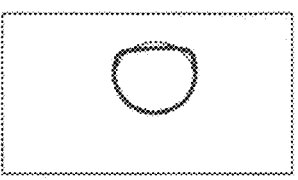

In addition, FIGS. 15A, 15B, 15C, 16A, 16B, and 16C show pupil detection results in case when a pupil hides behind an upper eyelid without noise. If there is no noise on the image and some part of a pupil hides behind an upper eyelid as shown in FIG. 15A, since all the edge detected by the edge detection section 12 is influenced by the upper eyelid, an edge(s) is detected so that an upper side is located lower than the actual pupil as shown in FIG. 15B. Therefore, if a pupil is detected from the edge shown in FIG. 15B by using the circle Hough transformation etc., a pupil may be erroneously detected as a circle slightly lower and smaller than the actual pupil in many cases as shown in FIG. 15C.

Figure 16A:
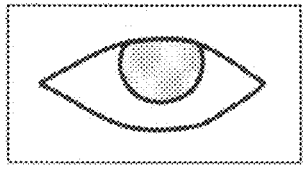
FIGS. 16A, 16B, and 16C are explanatory drawings for showing a second pupil detection result.
Figure 16B:
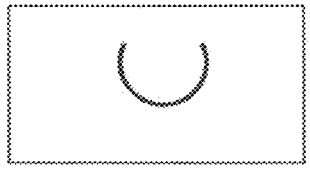
Figure 16C:
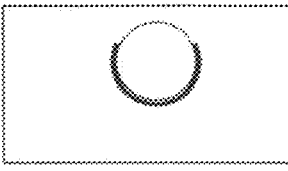
Figure 17A:
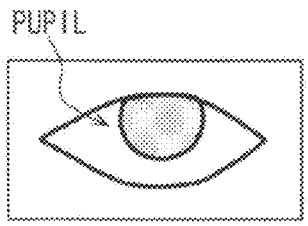
FIGS. 17A, 17B, and 17C are explanatory drawings for showing a conventional technique.
Figure 17B:
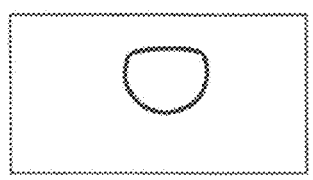
Figure 17C:
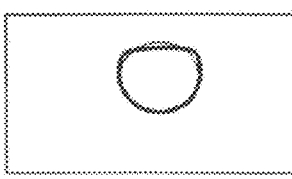

On the other hand, the second pupil detection result in this case is detected as a circle near the actual pupil. That is, if there is no noise on the image and some part of a pupil hides behind an upper eyelid as shown in FIG. 16A, the selection means removes an upper part of the detected edge and gives a selected effective edge as shown in FIG. 16B. Therefore, the second pupil detection result obtained by applying the circle Hough transformation to only the effective edge is never influenced by the upper part. Therefore, it is possible to detect a circle near the actual pupil as shown in FIG. 16C.

As mentioned above, in many cases, if a pupil is erroneously detected, the pupil detection result shows lower location of pupil. Therefore, it is possible to detect the pupil accurately in many situations by comparing the first pupil detection result and the second pupil detection result in heights in the image, and selecting one that is located higher.

As explained above, according to the pupil detecting apparatus 200 of this embodiment, since the apparatus compares the first pupil detection result which is detected based on all the edge detected and the second pupil detection result which is detected based on only the edge extending along a pupil, and selects one that shows a higher location of center coordinates of a circle of a pupil from the first and second pupil detection results. Therefore, one of the first and second pupil detection results that shows more exact pupil is selected as a final result of detection. It is possible to detect a pupil with sufficient accuracy while eliminating an influence by a noise on an edge.

In a case where a driver's face is illuminated by near infrared rays from both sides, a pupil may have a noise on both sides in many cases. However, a noise is not always appears. In addition, a pupil is hardly covered with things other than an upper eyelid. Taking those background into consideration, comparing the first and second pupil detection results in height of a center coordinates is considerably effective to improve accuracy of a pupil detection.

In this embodiment, the pupil circle detection section 15a and the pupil location determination section 16 provide a pupil detection means.

Other Embodiment

Although some embodiments of the present invention are described above, the present invention is not limited to the above-mentioned embodiments, and as long as it belongs to the technical scope of the present invention, it can take various forms.

For example, the pupil detection means may be configured to compare the first pupil detection result and the second pupil detection result in size in the image, and to select one that is larger. Comparing the results in size means that the apparatus compares sizes of pupil indicated by the first and second pupil detection results. For example, if both the first and second pupil detection results indicate circles in the image, the dimensions of the circles, such as radius and area, are compared. As mentioned above, an incorrect pupil detection result shows smaller circle than the actual pupil in many cases, such as in a case where a noise, such as a reflection light, is appears on both sides of a pupil, and in a case where a pupil is affected by an upper eyelid. However, by selecting one of the pupil detection results that shows larger pupil as a final one of selected result, it is possible to detect the pupil accurately in many situations.

For example, although heights of the center coordinates of circles of the first pupil detection result and the second pupil detection result are compared and the higher one is selected in the above-mentioned embodiment, instead of the above, the apparatus may use a criterion to select one that has longer radius from the first pupil detection result and the second pupil detection result. In this configuration, a pupil can be correctly detected in many situations. The processing in this case only requires changing of the criterion used in S310, and other processing are the same as that of the above-mentioned embodiment.

Similarly, in a case that only an area of a pupil is detected in an image, S310 may be modified to select a larger one after comparing areas of the first and second pupil detection results.

In the above-mentioned embodiment, although a pupil is detected as a circle by applying the circle Hough transformation to the edge, a pupil may be detected as an ellipse detected by applying the least square method.

Although, in the above-mentioned embodiment, the edge removal region is defined to have 5 pixels, this number of pixels may be obtained based on a height difference between the feature points, such as between FP1 and FP2, or FP3 and FP4.

The edge removal region may be defined based on a curved line, such as a Bezier curve and a spline curve. By using a curved line, in a comparison to a case using a straight line, it is possible to reserve more edge extending along a pupil, and to reduce a region to be removed.

In the above-mentioned embodiment, although only an edge, extending along an upper eyelid outline is removed, it is not limited to this and the apparatus may be configured to remove an edge extending along a lower eyelid. In this case, even if a driver narrows an eye to cover a pupil with a lower eyelid, a location of a pupil can be detected correctly.

Further, in the binarization processing in edge detection process, instead of predetermining the threshold value used for binarization, the apparatus may be configured to determine threshold value at each time by using a well-known discriminant analysis method. In this case, the binarization processing can be carried out strongly against changing of illumination, such as cases where a face image becomes bright as a whole, or becomes dark.

In the above-mentioned embodiment, although a driver can choose s0, si, A0(x), and Ai(x) according to own sex, age, or ethnic groups, selection conditions are not restricted to sex, age, and ethnic groups. Alternatively, s0, si, A0(x), and Ai(x) may be adjusted to be able to be used without being dependent on the conditions of sex, age, ethnic groups. Thereby, the user of this apparatus can be free from the time and effort to choose s0, si, A0(x), and Ai(x).

A technique of template matching can be used for detecting a region of an eye and for detecting an eye shape in stead of the face shape model.

Further, in the above-mentioned embodiments, a single camera is mounted on a vehicle and takes an image of a face of a driver. But, an embodiment of the present invention is not limited to a single camera configuration. A stereo image provided by a plurality of cameras can be used in an embodiment of the present invention.

A purpose and application of the pupil detecting apparatus according to the present invention is not limited to vehicles, such as a car. For example, the pupil detecting apparatus according to the present invention may be applied to trains, aircrafts, vessels, medical application machines, simulation machines, game machines, etc.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An apparatus for detecting a pupil comprising:
   acquisition means for acquiring an image provided by capturing a face using a camera;
   eye detection means for detecting an eye from the image acquired by the acquisition means;
   edge detection means for detecting an edge in a region of the eye detected by the eye detection means;
   pupil detection means for detecting a pupil from the edge detected by the edge detection means;
   eye shape detection means for detecting as an eye shape an outline of an upper eyelid of the eye; and
   selection means for selecting only an effective edge along the pupil by removing an edge removal region from the edge detected by the edge detection means, the edge removal region being defined as an area between (i) the outline of the upper eyelid detected by the eye shape detection means and (ii) a line located below the outline of the upper eyelid by a predetermined amount, wherein
   the pupil detection means detects the pupil by applying a circle transformation to the effective edge selected by the selection means.

2. The apparatus for detecting a pupil in claim 1, wherein the pupil detection means compares a first pupil detection result that indicates the pupil detected based on all of the edge detected by the edge detection means and a second pupil detection result that indicates the pupil detected based on only the effective edge selected by the selection means, and selects one of the first pupil detection result and the second pupil detection result based on a predetermined criterion for selection.

3. The apparatus for detecting a pupil in claim 2, wherein the pupil detection means compares the first pupil detection result and the second pupil detection result in heights in the image, and selects one that is located higher.

4. The apparatus for detecting a pupil in claim 2, wherein the pupil detection means compares the first pupil detection result and the second pupil detection result in size in the image, and selects one that is larger.

5. The apparatus for detecting a pupil in claim 1, wherein the eye shape detection means detects the eye shape based on a face shape model.

6. A non-transitory computer readable storage medium storing a program, that when executed by a computer performs a method of detecting a pupil in a face image, the method comprising:
- an acquiring step including acquiring an image provided by capturing a face using a camera;
- an eye detecting step including detecting an eye from the image acquired in the acquiring step;
- an edge detecting step including detecting an edge in a region of the eye detected in the eye detecting step;
- a pupil detecting step including detecting a pupil from the edge detected in the edge detecting step;
- an eye shape detecting step including detecting as an eye shape an outline of an upper eyelid of the eye detected in the eye detecting step; and
- an effective edge selecting step including selecting only an effective edge along the pupil by removing an edge removal region from the edge detected in the edge detecting step, the edge removal region being defined as an area between (i) the outline of the upper eyelid detected in the eye shape detecting step and (ii) a line below the outline of the upper eyelid by a predetermined amount, wherein
- in the pupil detecting step, the pupil is detected by applying a circle transformation to the effective edge selected in the effective edge selecting step.

7. The non-transitory computer readable storage medium in claim 6, wherein
- in the pupil detecting step, the pupil is further detected by comparing a first pupil detection result indicating the pupil detected based on all of the edge detected in the edge detecting step and a second pupil detection result indicating the pupil detected based on only the effective edge selected in the effective edge selecting step, and
- selecting one of the first pupil detection result and the second pupil detection result based on a predetermined criterion for selection.

8. A method for detecting a pupil, implemented on a computer programmed to perform the steps of the method, comprising:
- an acquiring step including acquiring, by the computer, an image provided by capturing a face using a camera;
- an eye detecting step including detecting by the computer, an eye from the image acquired in the acquiring step;
- an edge detecting step including detecting by the computer, an edge in a region of the eye detected in the eye detecting step;
- a pupil detecting step including detecting by the computer, a pupil from the edge detected in the edge detecting step;
- an eye shape detecting step including detecting by the computer, an eye shape including an outline of an upper eyelid of the eye; and
- an effective edge selecting step including selecting by the computer, only an effective edge along the pupil by removing an edge removal region from the edge detected in the edge detecting step, the edge removal region being defined as an area between (i) the outline of the upper eyelid detected in the eye shape detection step and (ii) a line located below the outline of the upper eyelid by a predetermined amount, wherein
- in the pupil detecting step, the pupil is detected by applying a circle transformation to the effective edge selected in the effective edge selecting step.

9. The method for detecting a pupil claimed in claim 8, wherein
- in the pupil detecting step, the pupil is further detected by comparing a first pupil detection result indicating the pupil detected based on all of the edge detected in the edge detecting step and a second pupil detection result indicating the pupil detected based on only the effective edge selected in the effective edge selecting step, and
- selecting one of the first pupil detection result and the second pupil detection result based on a predetermined criterion for selection.

10. The apparatus for detecting a pupil in claim 1, wherein:
the eye shape detection means detects the eye shape using a face shape model and detects the outline of the upper eyelid based on a plurality of feature points which are detected when detecting the eye shape using the face shape model.

11. The apparatus for detecting a pupil in claim 10, wherein:
the pupil detection means obtain a center and radius of the pupil by applying the circle transformation to the effective edge selected by the selection means.

12. The apparatus for detecting a pupil in claim 1, wherein:
the pupil detection means obtain a center and radius of the pupil by applying the circle transformation to the effective edge selected by the selection means.

* * * * *